(12) United States Patent
Lee et al.

(10) Patent No.: US 11,484,788 B2
(45) Date of Patent: Nov. 1, 2022

(54) APPARATUS AND METHOD FOR PREDICTING RESULT OF THE COMPUTER GAME

(71) Applicant: ELECTRONICS AND TELECOMMUNICATIONS RESEARCH INSTITUTE, Daejeon (KR)

(72) Inventors: Sang Kwang Lee, Daejeon (KR); Seong Il Yang, Daejeon (KR); Seung-Jin Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/137,741

(22) Filed: Dec. 30, 2020

(65) Prior Publication Data

US 2021/0197087 A1    Jul. 1, 2021

(30) Foreign Application Priority Data

Dec. 31, 2019   (KR) .................. 10-2019-0179849

(51) Int. Cl.
    *A63F 13/47*   (2014.01)
(52) U.S. Cl.
    CPC .................. *A63F 13/47* (2014.09)
(58) Field of Classification Search
    CPC ........... A63F 13/67; A63F 13/47; G06N 3/08; G06N 5/003; G06N 20/00
    See application file for complete search history.

(56) References Cited

U.S. PATENT DOCUMENTS

| | | | | |
|---|---|---|---|---|
| 6,147,696 A * | 11/2000 | Smith | ................ | A63F 13/352 345/533 |
| 7,787,411 B2 * | 8/2010 | Lum | .................. | H04L 1/004 370/319 |
| 7,883,419 B2 * | 2/2011 | Cheung | ............... | A63F 13/12 463/42 |
| 8,113,960 B2 * | 2/2012 | Kaneko | ............. | G06Q 30/02 463/42 |

(Continued)

FOREIGN PATENT DOCUMENTS

| KR | 10-0621559 B1 | 9/2006 |
|---|---|---|
| KR | 10-2019-0045043 A | 5/2019 |

OTHER PUBLICATIONS

Vanessa Volz et al., "Towards Embodied StarCraft II Winner Prediction", In: Cazenave T., Saffidine A., Sturtevant N. (eds) Computer Games. CGW 2018. Communications in Computerand Information Science, vol. 1017. Springer, Cham, https://doi.org/10.1007/978-3-030-24337-1_1.

(Continued)

*Primary Examiner* — David L Lewis
*Assistant Examiner* — Matthew D Hoel
(74) *Attorney, Agent, or Firm* — LRK Patent Law Firm (57) ABSTRACT

An apparatus and a method for predicting a result of a computer game at a specific time point using obtaining play attributes of the computer game in a time slot including the specific time point; and predicting the result of the computer game at the specific time point by inputting the play attributes to a game result prediction model corresponding to the time slot are provided.

11 Claims, 4 Drawing Sheets

(56) References Cited

U.S. PATENT DOCUMENTS

| | | | | |
|---|---|---|---|---|
| 8,396,021 B2* | 3/2013 | Lum | H04W 28/04 | 370/319 |
| 9,302,179 B1* | 4/2016 | Merzenich | G09B 5/00 | |
| 9,308,445 B1* | 4/2016 | Merzenich | A63F 13/537 | |
| 9,308,446 B1* | 4/2016 | Merzenich | A63F 13/537 | |
| 9,375,643 B2* | 6/2016 | Brenden | H04N 5/74 | |
| 9,579,576 B2* | 2/2017 | Cao | A63F 13/54 | |
| 9,601,026 B1* | 3/2017 | Merzenich | A63F 13/537 | |
| 9,687,734 B2* | 6/2017 | Morimura | A63F 13/35 | |
| 9,824,602 B2* | 11/2017 | Merzenich | A63F 13/537 | |
| 9,886,866 B2* | 2/2018 | Merzenich | G09B 19/00 | |
| 9,911,348 B2* | 3/2018 | Merzenich | A63F 13/67 | |
| 9,919,207 B2* | 3/2018 | Brenden | H04L 51/32 | |
| 10,002,544 B2* | 6/2018 | Merzenich | A63F 13/537 | |
| 10,216,474 B2* | 2/2019 | Milevski | G06F 3/011 | |
| 10,293,256 B2* | 5/2019 | Cao | A63F 13/12 | |
| 10,343,069 B2* | 7/2019 | Noss | A63F 13/47 | |
| 10,361,982 B2* | 7/2019 | Longdale | H04L 51/02 | |
| 10,467,808 B2* | 11/2019 | Murdock | G06T 19/003 | |
| 10,518,177 B2* | 12/2019 | Suzuki | A63F 13/58 | |
| 10,576,383 B2* | 3/2020 | Komaba | A63F 13/48 | |
| 10,583,362 B2* | 3/2020 | Suzuki | A63F 13/44 | |
| 10,608,974 B2* | 3/2020 | Longdale | G06F 40/134 | |
| 10,610,772 B2* | 4/2020 | Morimura | A63F 13/10 | |
| 10,673,924 B2* | 6/2020 | Boudville | A63F 13/65 | |
| 10,679,125 B1* | 6/2020 | Li | G06N 3/0427 | |
| 10,695,676 B2* | 6/2020 | Miyamoto | A63F 13/47 | |
| 10,722,798 B1* | 7/2020 | Johnson | A63F 13/55 | |
| 10,765,949 B1* | 9/2020 | Li | A63F 13/847 | |
| 10,905,960 B2* | 2/2021 | Yoneyama | A63F 13/47 | |
| 10,987,593 B2* | 4/2021 | Trombetta | H04L 67/306 | |
| 10,994,213 B2* | 5/2021 | Komaba | A63F 13/822 | |
| 11,017,599 B2* | 5/2021 | Murdock | G06T 19/003 | |
| 11,117,053 B2* | 9/2021 | Noss | A63F 13/533 | |
| 11,135,509 B2* | 10/2021 | French | A63F 13/35 | |
| 11,219,826 B2* | 1/2022 | Suzuki | A63F 13/44 | |
| 11,338,202 B1* | 5/2022 | Weising | A63F 13/47 | |
| 2002/0054016 A1* | 5/2002 | Smith | H04N 21/2143 | 345/156 |
| 2002/0054626 A1* | 5/2002 | Inamura | A63F 13/843 | 375/219 |
| 2004/0110563 A1* | 6/2004 | Tanaka | A63F 13/12 | 463/39 |
| 2006/0256819 A1* | 11/2006 | Lum | H04W 80/00 | 370/493 |
| 2008/0182663 A1* | 7/2008 | Cheung | A63F 13/332 | 463/41 |
| 2009/0264172 A1* | 10/2009 | Morimura | A63F 13/212 | 463/7 |
| 2009/0305788 A1* | 12/2009 | Bronstein | A63F 13/60 | 463/42 |
| 2010/0029382 A1* | 2/2010 | Cao | A63F 13/47 | 463/31 |
| 2010/0114892 A1* | 5/2010 | Kaneko | A63F 13/85 | 707/737 |
| 2010/0197404 A1* | 8/2010 | Lum | H04W 80/00 | 463/39 |
| 2011/0244946 A1* | 10/2011 | Porwal | A63F 13/655 | 707/706 |
| 2015/0196841 A1 | 7/2015 | Lee | | |
| 2015/0238862 A1* | 8/2015 | Suzuki | A63F 13/58 | 463/31 |
| 2015/0352451 A1* | 12/2015 | Brenden | A63F 13/86 | 463/31 |
| 2016/0012741 A1* | 1/2016 | Lee | G06Q 50/20 | 434/322 |
| 2016/0155353 A1* | 6/2016 | Merzenich | G09B 5/06 | 434/236 |
| 2016/0155354 A1* | 6/2016 | Merzenich | A63F 13/47 | 434/236 |
| 2016/0155355 A1* | 6/2016 | Merzenich | A63F 13/80 | 434/236 |
| 2016/0375361 A1* | 12/2016 | Brenden | H04N 5/74 | 463/31 |
| 2017/0120149 A1* | 5/2017 | Cao | A63F 13/47 | |
| 2017/0148343 A1* | 5/2017 | Merzenich | A63F 13/47 | |
| 2017/0252641 A1* | 9/2017 | Morimura | A63F 13/65 | |
| 2017/0337164 A1* | 11/2017 | Longdale | H04L 51/046 | |
| 2017/0339089 A1* | 11/2017 | Longdale | G06F 40/134 | |
| 2018/0011682 A1* | 1/2018 | Milevski | G06F 3/165 | |
| 2018/0093191 A1 | 4/2018 | Lee | | |
| 2018/0124148 A1* | 5/2018 | Boudville | A63F 13/5378 | |
| 2018/0225873 A1* | 8/2018 | Murdock | G06F 3/011 | |
| 2018/0280794 A1* | 10/2018 | Brenden | A63F 13/48 | |
| 2018/0290060 A1* | 10/2018 | Noss | A63F 13/47 | |
| 2019/0001226 A1* | 1/2019 | Komaba | A63F 13/822 | |
| 2019/0030436 A1* | 1/2019 | Miyamoto | A63F 13/67 | |
| 2019/0143217 A1* | 5/2019 | Yoneyama | A63F 13/52 | 463/42 |
| 2019/0299096 A1* | 10/2019 | Suzuki | A63F 13/58 | |
| 2019/0303769 A1* | 10/2019 | Xie | G06N 3/006 | |
| 2019/0388787 A1* | 12/2019 | Padmanabhan | G09B 19/00 | |
| 2020/0066039 A1* | 2/2020 | Murdock | A63F 13/67 | |
| 2020/0086217 A1* | 3/2020 | Trombetta | A63F 13/493 | |
| 2020/0094142 A1* | 3/2020 | Suzuki | A63F 13/44 | |
| 2020/0122039 A1* | 4/2020 | Meuleau | G06N 3/02 | |
| 2020/0155950 A1* | 5/2020 | Komaba | A63F 13/822 | |
| 2020/0289939 A1* | 9/2020 | Hagland | A63F 13/355 | |
| 2020/0406138 A1* | 12/2020 | Suzuki | A63F 13/58 | |
| 2021/0016185 A1* | 1/2021 | Linguanti | A63G 7/00 | |
| 2021/0069592 A1* | 3/2021 | Noss | A63F 13/67 | |
| 2021/0077906 A1* | 3/2021 | Akaza | A63F 13/814 | |
| 2021/0165481 A1* | 6/2021 | Brugarolas Brufau | G06T 13/20 | |
| 2021/0197087 A1* | 7/2021 | Lee | G06N 20/00 | |
| 2021/0245044 A1* | 8/2021 | French | A63F 13/47 | |
| 2021/0245059 A1* | 8/2021 | Trombetta | G07F 17/3272 | |
| 2021/0255471 A1* | 8/2021 | Trisnadi | A63F 13/25 | |
| 2021/0264319 A1* | 8/2021 | Cao | G06F 3/0482 | |
| 2021/0275911 A1* | 9/2021 | Padmanabhan | G06F 40/30 | |
| 2021/0291051 A1* | 9/2021 | Edridge | A63F 13/44 | |
| 2021/0362054 A1* | 11/2021 | Blok | A63F 13/47 | |
| 2021/0387091 A1* | 12/2021 | Noss | A63F 13/5375 | |
| 2022/0054943 A1* | 2/2022 | Wu | A63F 13/57 | |
| 2022/0168636 A1* | 6/2022 | Weising | A63F 13/47 | |

OTHER PUBLICATIONS

Weiqi Wang, "Predicting Multiplayer Online Battle Arena (MOBA) Game Overcome Based on Hero Draft Data", MSc Research Project in Data Analytics, Dec. 21, 2016, Natioanl College of Ireland.

Lijun Yu et al., "MOBA-Slice: A Time Slice Based Evaluation Framework of Relative Advantage between Teams in MOBA Games", In: Cazenave T., Saffidine A., Sturtevant N. (eds) Computer Games. CGW 2018. Communications in Computer and Information Science, vol. 1017. Springer, Cham. https://doi.org/10.1007/978-3-030-24337-1_2.

Ji-Min Ku et al., "Design and Application of a Winning Forecast Model of the AOS Genre Game", KIISE Transactions an Computing Practices, vol. 23, No. 1, pp. 37-44, 2017. 1.

Dong-Wook Kim, "A study for the prediction of winning of e-Sports by using machine Learning", Master's Thesis, Graduate School of Software Soongsil University, Dec. 2016.

* cited by examiner

APPARATUS AND METHOD FOR PREDICTING RESULT OF THE COMPUTER GAME

CROSS-REFERENCE TO RELATED APPLICATION

This application claims priority to and the benefit of Korean Patent Application No. 10-2019-0179849 filed in the Korean Intellectual Property Office on Dec. 31, 2019, the entire content of which is incorporated herein by reference.

BACKGROUND OF THE INVENTION

1. Field of the Invention

The present disclosure relates to a method and an apparatus for predicting a result of the computer game at a specific time point during play of the game.

2. Description of Related Art

It is necessary to predict a result of a computer game in order to improve understanding for the computer game characteristics and use it as a basis for developing the player's strategy. A model for predicting the result of the computer games using data acquired from a single player of a conventional real-time strategy simulation game (real-time tactics simulation, RTS) has been proposed. In addition, a model which predicts the result of the computer game based on the champion data selected by each team in a multiplayer online battle arena (MOBA) genre game, or a model which analyzes the result of the computer game by dividing the elements that determine the result of the computer game has been also proposed. However, the above computer game result analysis model uses the same play attributes from the start of the computer game to the end of the computer game to analyze the result of the computer game.

SUMMARY OF THE INVENTION

An embodiment provides an apparatus for predicting a result of a computer game at a specific time point during play of the computer game.

Another embodiment provides a method for predicting a result of a computer game at a specific time point during play of the computer game.

Yet another embodiment provides a method for predicting a result of a computer game at a specific time point during play of the computer game.

According to an embodiment, an apparatus for predicting a result of a computer game at a specific time point during play of the computer game is provided. The apparatus includes: a processor and a memory, wherein the processor executes a program stored in the memory to perform: obtaining play attributes of the computer game in a time slot including the specific time point; and predicting the result of the computer game at the specific time point by inputting the play attributes to a game result prediction model corresponding to the time slot.

When the processor performs the obtaining a play attribute of the computer game in a time slot including a specific time point, the processor may perform: obtaining a list of the play attributes of the computer game in the time slot; and extracting the play attributes included in the list from log data of the computer game.

The processor may execute the program to further perform: extracting play elements of the computer game from pre-stored log data; analyzing extracted play elements to determine the play attributes by time slot; and generating a plurality of game result prediction models by time slot based on the play attributes by time slot and the result of the computer game according to the play attributes by time slot, and wherein the game result prediction model in the step of the predicting of the result of the computer game at the specific time point is one of the plurality of game result prediction models.

When the processor performs the generating a plurality of game result prediction models by time slot based on the play attributes by time slot and the result according to the play attributes by time slot, the processor may perform: determining, for each time slot, importance of the play attributes by time slot; and generating the plurality of game result prediction models in a decision tree method based on the importance for each time slot.

When the processor performs the generating a plurality of game result prediction models by time slot based on the play attributes by time slot and the result according to the play attributes by time slot, the processor may perform: analyzing a correlation between the play attributes by time slot; and generating the plurality of game result prediction models based on the analysis result of the correlation.

According to another embodiment, a method for predicting a result of a computer game at a specific time point during play of the computer game is provided. The method includes: determining a time slot including the specific time point, obtaining play attributes of the computer game in the time slot including the specific time point; and predicting the result of the computer game at the specific time point by inputting the play attributes to a game result prediction model corresponding to the time slot.

The obtaining play attributes of the computer game in the time slot including the specific time point may include: obtaining a list of the play attributes of the computer game in the time slot; and extracting the play attributes included in the list from log data of the computer game.

The method may further include: extracting play elements of the computer game from pre-stored log data; analyzing extracted play elements to determine the play attributes by time slot; and generating a plurality of game result prediction models by time slot based on the play attributes by time slot and the result of the computer game according to the play attributes by time slot, and wherein the game result prediction model in the step of predicting of the result of the computer game at the specific time point is one of the plurality of game result prediction models.

The generating a plurality of game result prediction models by time slot based on the play attributes by time slot and the result of the computer game according to the play attributes by time slot may include: determining, for each time slot, importance of the play attributes by time slot; and generating the plurality of game result prediction models in a decision tree method based on the importance for each time slot.

The generating a plurality of game result prediction models by time slot based on the play attributes by time slot and the result of the computer game according to the play attributes by time slot may include: analyzing a correlation between the play attributes by time slot; and generating the plurality of game result prediction models based on the analysis result of the correlation.

According to yet another embodiment, a method for predicting a result of a computer game at a specific time point during play of the computer game is provided. The method includes: generating play attributes by each time slot and a plurality of game result prediction models by each time slot from pre-stored log data of the computer game; and predicting the result of the computer game at the specific time point by inputting the play attributes corresponding the time slot including the specific time point into a game result prediction model for the time slot, wherein the game result prediction model for the time slot is one of the plurality of game result prediction models.

DETAILED DESCRIPTION OF THE EMBODIMENTS

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

In this specification, unless explicitly described to the contrary, the word "comprise", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

Figure 1:
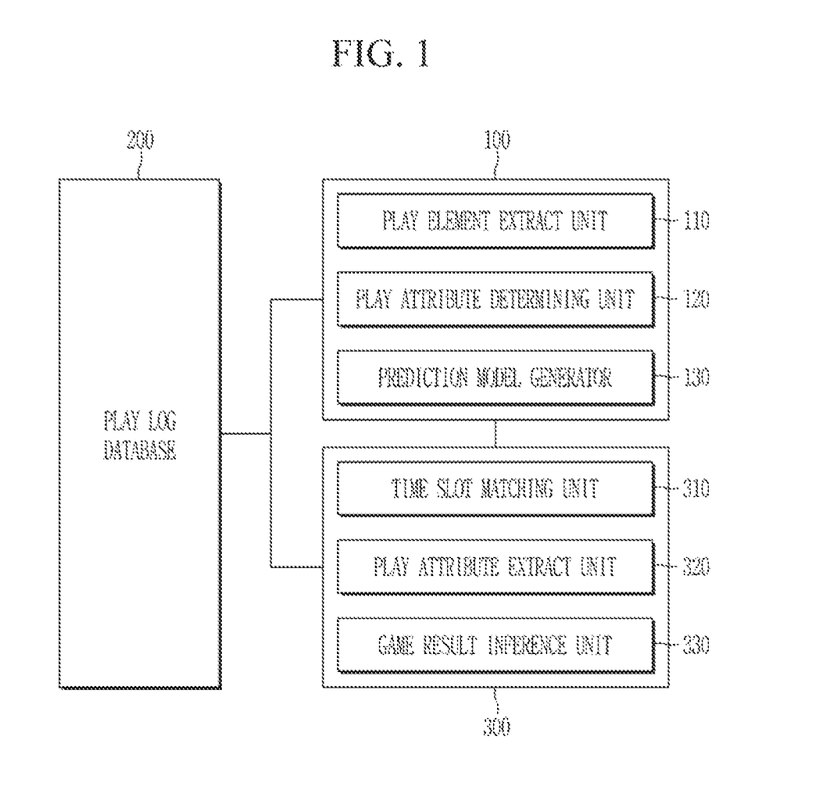
FIG. 1 is a block diagram illustrating a game result prediction apparatus according to an embodiment.

FIG. 1 is a block diagram illustrating a game result prediction apparatus according to an embodiment.

The game result prediction apparatus 10 according to an embodiment may perform training an artificial neural network (ANN) for predicting a result of the computer game, and predict a result of the computer game at a specific time point using a game result prediction model generated as a result of the training. The result of the computer game at the specific time point may be a win probability of the player of the game or the win possibility of a group (or team) to which the player of the game belongs, for example, a win rate at the specific time point. The computer game may be a game under development, or may be a game that is running after being developed.

Referring to FIG. 1, the game result prediction apparatus 10 according to the embodiment may include a game result prediction modeling processor 100, a play log database 200, and a game result prediction processor 300. The game result prediction modeling processor 100 may include a play element extract unit 110, a play attribute determining unit 120, and a prediction model generator 130. The game result prediction processor 300 may include a time slot matching unit 310, a play attribute extract unit 320, and a game result inference unit 330. The play log database 200 may be connected to the game result prediction modeling processor 100 and the game result prediction processor 300, respectively.

The play element extract unit 110 may extract play elements of the computer game from log data previously stored in the play log database 200. The computer game may be a real-time strategy simulation (RTS) genre, a multiplayer online battle arena (MOBA) genre, or the like. The play elements are materials of play attributes, and the play attributes for predicting the result of the computer game may be determined through analysis and processing of the play elements. For example, in a League of Legend (LOL) game, a difference in the amount of gold collected by each player group may be determined as the play attribute to predict the result of the computer game, and the amount of gold collected by each group to determine the difference in the amount of gold collected by each group may be the play element. The play elements may be used as an input to determine the play attributes, or the play elements may be used as it is as the play attributes.

The play attribute determining unit 120 may analyze the play elements extracted by the play element extract unit 110 to determine the play attributes for each time slot. The play attributes by time slot may be used to predict the result of the computer game for each time slot. For example, when the game result prediction apparatus 10 according to the embodiment predicts the result of the computer game of each player group of the League of Legends game, that is, when determining the game win probability of each player group at every time point, the play attribute determining unit 120 may determine the champion (character) information for each line, the amount of collected gold, the number of kills of enemy champions, the number of objects killed (e.g., towers, dragons, barons), the visual field score, etc. as the play attributes necessary to determine the win probability.

The prediction model generator 130 may perform machine learning based on the play attribute by time slot and the result of the computer game according to the play attributes by time slot, and generate a game result prediction model by time slot as the result of the machine learning. For example, the prediction model generator 130 may generate the game result prediction model for each time slot by using a decision tree method based on importance of each play attribute by time slot. To this end, the prediction model generator 130 may determine, for each time slot, the importance of each play attribute by time slot. Alternatively, the prediction model generator 130 may analyze a correlation between play attributes by time slot, and generate the game result prediction model by time slot based on the correlation analysis result. Through the correlation analysis, the overlapping play attributes for each time slot may be excluded when the game result prediction model is generated.

The time slot matching unit 310 may match a specific time point (or a selected time point) to a predetermined time slot, and obtain a list of play attributes of a time slot matched at the specific time point.

The play attribute extract unit 320 may extract play attributes included in the list of the play attributes from real-time log data at the specific time point.

The game result inference unit 330 may infer the result of the computer game at the specific time point by inputting the play attributes of the specific time point into the game result prediction model by time slot matched at the specific time point.

In the following, the method for predicting the result of the computer game is described through the training step of the game result prediction modeling processor 100 which generates the game result prediction model for each time slot and inference step of the game result prediction processor 300 which predicts the result of the computer game at a specific time point from the game result prediction model by time slot using the play attributes at the specific time point.

Figure 2:
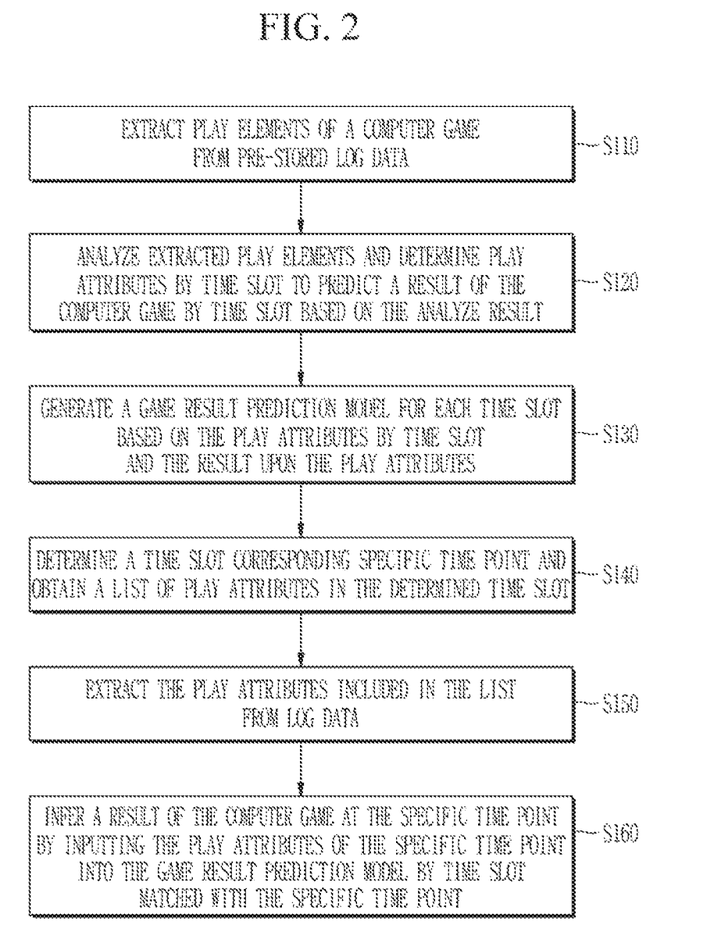
FIG. 2 is a flowchart illustrating a game result prediction method according to an embodiment.
Figure 3:
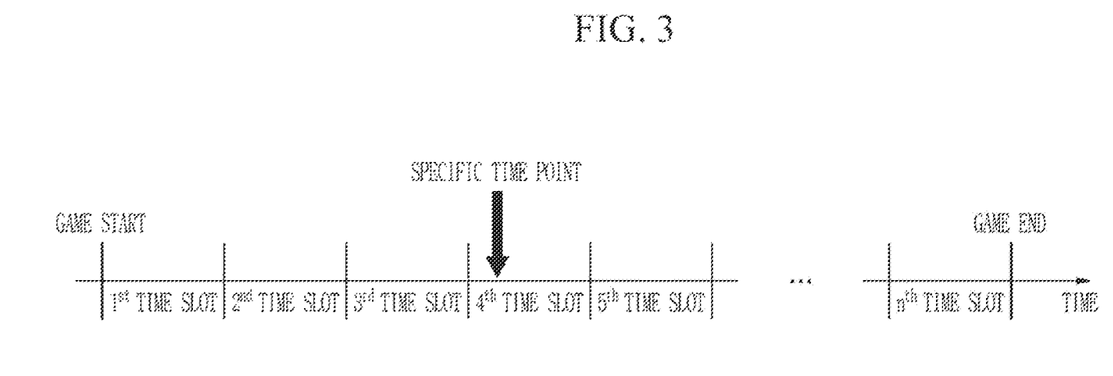
FIG. 3 is a schematic diagram illustrating each time slot between a game start and a game end according to an embodiment.

FIG. 2 is a flowchart illustrating a game result prediction method according to an embodiment, and FIG. 3 is a schematic diagram illustrating each time slot between a game start and a game end according to an embodiment.

Referring to FIG. 2, in the training step, the play element extract unit 110 may extract the play elements of the computer game from log data previously stored in the play log database 200 S110. Then, the play attribute determining unit 120 may analyze the extracted play elements and determine the play attributes for each time slot S120. As shown in FIG. 3, the play time of the computer game may be divided into n time slots included between the game start and the game end. The play attribute determining unit 120 may determine the play attributes of each time slot for generating a game prediction model for each time slot from the analysis result of the play element of the log data. The prediction model generator 130 may generate a game result prediction model for each time slot by performing supervised learning based on the play attributes by time slot and the game result corresponding to the play attributes S130. Referring to FIG. 3, n number of time slots from the start of the game to the end of the game may be divided, and thus the prediction model generator 130 may generate the game result prediction model for each time slot, that is, generate a total of n game result prediction models.

In the inference step, the time slot matching unit 310 of the game result predicting processor 300 may determine a time slot including the specific time point (or the selected time point), and obtain a list of the play attributes for the determined time slot S140. The specific time point may be a time point selected by a user playing the computer game during play of the computer game or a time point according to a predetermined period. For example, the developer of the computer game may use the game result prediction device 10 to predict the win probability of a specific player at the specific time point during the game or a certain team to which the specific player belongs while developing the computer game or when the computer game is being serviced. Alternatively, the win probability for each time point determined by the game result prediction apparatus 10 may be displayed on one side of the game screen or on a pop-up window according to a selection of the player when the computer game is being played. Here, the timing at which the win probability is displayed may be a timing point according to a predetermined period.

The play attribute extract unit 320 may extract the play attributes included in the list from log data of the computer game S150. The log data of the computer game may be stored in the play log database 200 in real-time while the game is in progress, or may be stored in the play log database 200 after the game is completed. Alternatively, the log data of the computer game may be input to the game result prediction processor 300 while the game is in progress.

The game result inference unit 330 may infer the result of the computer game at the specific time point by inputting the play attributes at the specific time point to the game result prediction model for a time slot including the specific time point S160.

As described above, the result of the computer game at the specific time point may be accurately predicted in game development, game service, game relay, etc. through the game result prediction model generated from play attributes close to the time slot of the played computer game. In addition, a game developer, a game publisher, or a game manager may obtain game metadata about wins, preferences, matches, etc. by analyzing the log data of the computer game play as described above.

Figure 4:
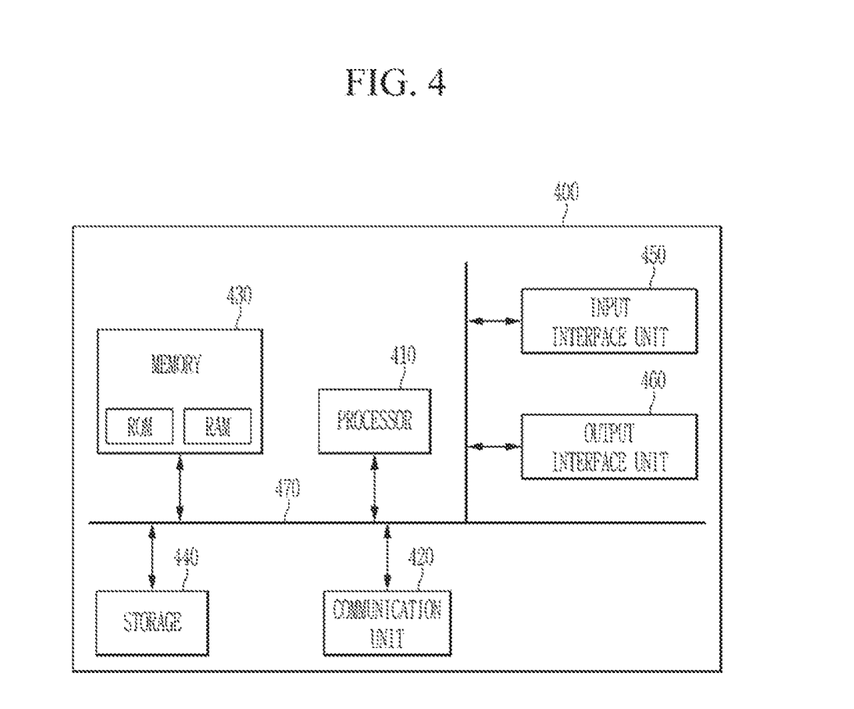
FIG. 4 is a block diagram illustrating a game result prediction apparatus according to another embodiment.

FIG. 4 is a block diagram illustrating a game result prediction apparatus according to another embodiment.

The game result prediction apparatus according to another embodiment may be implemented as a computer system, for example, a computer-readable medium. Referring to FIG. 4, the computer system 400 may include at least one of a processor 410, a memory 430, an input interface device 450, an output interface device 460, and a storage device 440 communicating through a bus 470. The computer system 400 may also include a communication device 420 coupled to the network. The processor 410 may be a central processing unit (CPU) or a semiconductor device that executes instructions stored in the memory 430 or the storage device 440. The memory 430 and the storage device 440 may include various forms of volatile or nonvolatile storage media. For example, the memory may include read only memory (ROM) or random access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 420 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

What is claimed is:

1. An apparatus for training an artificial neural network for analyzing the operation of a computer game by predicting a result of the computer game at a specific time point during play of the computer game, the apparatus comprising:
 a processor and a memory for training the neural network, wherein the processor executes a program stored in the memory to perform:
 obtaining play attributes of the computer game in a time slot including the specific time point; and
 predicting the result of the computer game at the specific time point by inputting the play attributes to a game result prediction model generated based on the training of the neural network thereby improving an understanding of the computer game characteristics and operation during development and testing of the computer game,
 wherein the game result prediction model corresponds to the time slot including the specific time point.

2. The apparatus of claim 1, wherein when the processor performs the obtaining a play attribute of the computer game in a time slot including a specific time point, the processor performs:
 obtaining a list of the play attributes of the computer game in the time slot; and
 extracting the play attributes included in the list from log data of the computer game.

3. The apparatus of claim 1, wherein the processor executes the program to further perform:
 extracting play elements of the computer game from pre-stored log data;
 analyzing extracted play elements to determine the play attributes by time slot; and
 generating a plurality of game result prediction models by time slot based on the play attributes by time slot and the result of the computer game according to the play attributes by time slot, and
 wherein the game result prediction model in the step of the predicting of the result of the computer game at the specific time point is one of the plurality of game result prediction models.

4. The apparatus of claim 3, wherein when the processor performs the generating a plurality of game result prediction models by time slot based on the play attributes by time slot and the result according to the play attributes by time slot, the processor performs:
 determining, for each time slot, importance of the play attributes by time slot; and
 generating the plurality of game result prediction models in a decision tree method based on the importance for each time slot.

5. The apparatus of claim 3, wherein when the processor performs the generating a plurality of game result prediction models by time slot based on the play attributes by time slot and the result according to the play attributes by time slot, the processor performs:
 analyzing a correlation between the play attributes by time slot; and
 generating the plurality of game result prediction models based on the analysis result of the correlation.

6. A method for training an artificial neural network for analyzing the operation of a computer game by predicting a result of a computer game at a specific time point during play of the computer game, the method comprising:
 determining a time slot including the specific time point;
 obtaining play attributes of the computer game in the time slot including the specific time point; and
 predicting the result of the computer game at the specific time point by inputting the play attributes to a game result prediction model generated based on the training of the neural network thereby improving an understanding of the computer game characteristics and operation during development and testing of the computer game,
 wherein the game result prediction model corresponds to the time slot including the specific time point.

7. The method of claim 6, wherein the obtaining play attributes of the computer game in the time slot including the specific time point comprises:
 obtaining a list of the play attributes of the computer game in the time slot; and
 extracting the play attributes included in the list from log data of the computer game.

8. The method of claim 6, further comprising:
 extracting play elements of the computer game from pre-stored log data;
 analyzing extracted play elements to determine the play attributes by time slot; and
 generating a plurality of game result prediction models by time slot based on the play attributes by time slot and the result of the computer game according to the play attributes by time slot, and
 wherein the game result prediction model in the step of predicting of the result of the computer game at the specific time point is one of the plurality of game result prediction models.

9. The method of claim 8, wherein the generating a plurality of game result prediction models by time slot based on the play attributes by time slot and the result of the computer game according to the play attributes by time slot comprises:
 determining, for each time slot, importance of the play attributes by time slot; and
 generating the plurality of game result prediction models in a decision tree method based on the importance for each time slot.

10. The method of claim 8, wherein the generating a plurality of game result prediction models by time slot based on the play attributes by time slot and the result of the computer game according to the play attributes by time slot comprises:
 analyzing a correlation between the play attributes by time slot; and
 generating the plurality of game result prediction models based on the analysis result of the correlation.

11. A method for training an artificial neural network for analyzing the operation of a computer game by predicting a result of a computer game at a specific time point during play of the computer game, the method comprising:
 generating play attributes by each time slot and a plurality of game result prediction models by each time slot from pre-stored log data of the computer game; and
 predicting the result of the computer game at the specific time point by inputting the play attributes corresponding the time slot including the specific time point into a game result prediction model for the time slot,
 wherein the game result prediction model for the time slot is one of the plurality of game result prediction models generated based on the training of the neural network thereby improving an understanding of the computer game characteristics and operation during development and testing of the computer game.

* * * * *